United States Patent
Koyama et al.

[19]

[11] Patent Number: 5,970,821
[45] Date of Patent: Oct. 26, 1999

[54] CONTROL SYSTEM FOR AUTOMATIC TRANSMISSION FOR VEHICLE

[75] Inventors: Hideo Koyama; Masamitsu Hirano; Hiroyuki Kimura; Takeo Furuta; Masatoshi Nishina, all of Wako, Japan

[73] Assignee: Honda Giken Kogyo Kabushiki Kaisha, Tokyo, Japan

[21] Appl. No.: 09/136,956

[22] Filed: Aug. 20, 1998

[30] Foreign Application Priority Data

Aug. 22, 1997 [JP] Japan .................................. 9-226789

[51] Int. Cl.$^6$ .................................................. F16H 61/16
[52] U.S. Cl. ........................................ 74/731.1; 180/197
[58] Field of Search ........................... 74/731.1; 180/197

[56] References Cited

FOREIGN PATENT DOCUMENTS 64-7259  2/1989  Japan .

Primary Examiner—Dirk Wright
Attorney, Agent, or Firm—Nikaido, Marmelstein, Murray & Oram LLP

[57] ABSTRACT

It is an object of the present invention to provide a control system for an automatic transmission, which operates so that when slipping of drive wheels is generated at the starting of a vehicle on ice or the like, upshifting from a second gear shift stage to a third gear shift stag is prohibited. However, when the pseudo slipping state of the drive wheels is detected with the locking or unlocking of the drive wheels, the undesirable prohibition of the upshifting of the automatic transmission is avoided. A slip rate of a torque converter is determined on the basis of an engine revolution-speed (a torque converter input rotation-speed) and an automatic transmission input rotation-speed (a torque converter output rotation-speed). When the slip rate exceeds, for example, 102%, so that the driving force is transmitted from the drive wheels toward the engine, it is determined that the pseudo slipping state attendant to the locking or unlocking of the drive wheels has been detected, thereby canceling the prohibition of the upshifting of the automatic transmission.

2 Claims, 14 Drawing Sheets

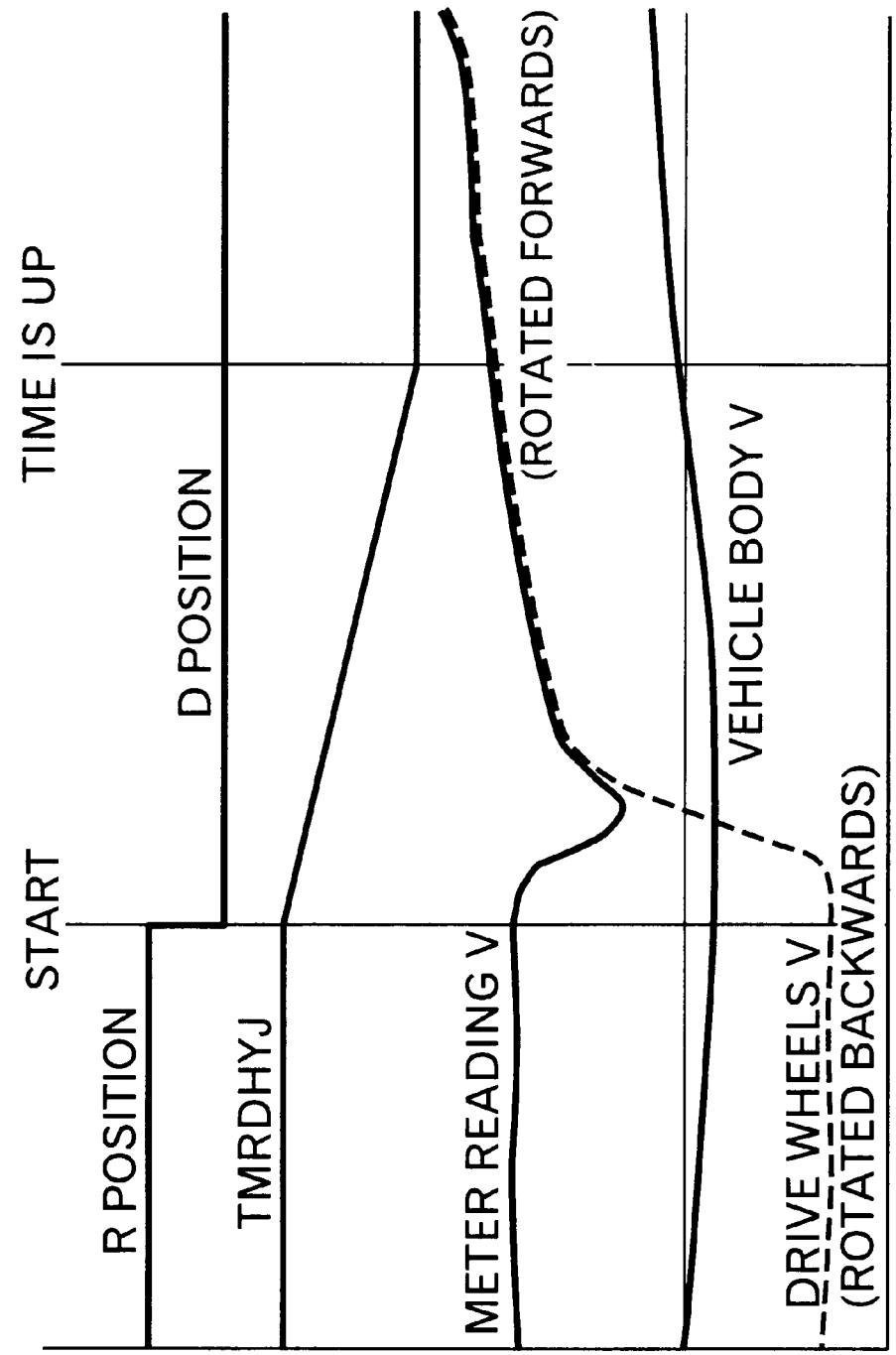

5,970,821

CONTROL SYSTEM FOR AUTOMATIC TRANSMISSION FOR VEHICLE

BACKGROUND OF THE INVENTION

1. Field of the Invention

The present invention relates to a control system for an automatic transmission for a vehicle, and more particularly, to a control system for an automatic transmission for a vehicle, wherein the shifting of the automatic transmission is prohibited when a slipping state of the vehicle it, determined.

2. Description of the Prior Art

When a vehicle provided with a vehicle speed detecting means for detecting a vehicle speed, on the basis of a rotational speed of a rotatable member of an automatic transmission, is started on ice having a small friction coefficient, the rotational speed of the rotatable member is increased if drive wheels slip. For this reason, the vehicle speed detecting means detects a higher vehicle speed, but the actual vehicle speed remains lower, because gripping between the drive wheels and the road surface has been lost. In this case, because the vehicle speed detecting means detects the higher vehicle speed, there is a possibility that the automatic transmission is upshifted, whereby the number of rotations of the drive wheels is further increased to exert an influence on the durability of a differential or the like.

A control system is known from Japanese Patent Publication No. 64-7259, which is designed, so that when the rotational acceleration of a rotatable member of the automatic transmission becomes equal to larger than a predetermined value, it is determined that the drive wheels are in slipping states, thereby prohibiting the upshifting.

When the vehicle provided with such a control system for the automatic transmission, travels at a high speed on a usual road surface, if a hard braking is carried out which locks the drive wheels, the automatic transmission is downshifted to a first gear shift stage. When the braking is released from this state, the number of rotations of the drive wheels restoring the gripping is steeply increased from zero. For this reason, there is a possibility that the control system misjudges that the slipping of the drive wheels has been generated at the starting of the vehicle on an ice or the like and as a result, the upshifting of the automatic transmission is prohibited to generate over revolution of the engine.

SUMMARY OF THE INVENTION

The present invention has been accomplished with the above circumstance in view, and it is an object of the present invention to ensure that when a steep increase in vehicle speed is detected with the unlocking of the drive wheels, such increase is not misjudged as being a steep increase in pseudo vehicle speed due to the slipping of the drive wheels on an ice. Thus, the undesirable prohibition of the shifting of the automatic transmission is prevented.

To achieve the above object, there is provided a control system for an automatic transmission for a vehicle, comprising a shifting control means adapted to change the gear shift stage of the automatic transmission in accordance with the operational state of the vehicle, a vehicle speed detecting means for detecting the vehicle speed on the basis of the rotational speed of a rotatable member of the automatic transmission, and a slipping-state determining means for determining a slipping state of the vehicle on the basis of the rate of variation in vehicle speed detected by the vehicle speed detecting means. A shifting prohibiting means prohibits the shifting of the automatic transmission by the shifting control means, when the slipping state is determined by the slipping-state determining means, and a coupler connects an engine and the automatic transmission to each other. The control system further includes a coupler slip rate detecting means for detecting the slip rate of the coupler, and a shifting-prohibition canceling means for canceling the prohibition of shifting by the shifting prohibiting means, when the slip rate of the coupler is detected to be equal to or larger than a predetermined value by the coupler slip rate detecting means.

With the above arrangement, when the drive wheels slip at the starting of the vehicle on ice, if the vehicle speed detecting means for detecting the vehicle speed on the basis of the speed of rotations of a rotatable member of the automatic transmission detects an steep increase in pseudo vehicle speed, it is determined by the slipping-state determining means that the vehicle has slipped, whereby the shifting prohibiting means prohibits the shifting of the automatic transmission by the shifting control means. Therefore, it is possible to prevent the differential or the like from being damaged due to undesirable upshifting being carried out.

When the vehicle traveling at a high speed on a usual road surface, is braked hard to lock the drive wheels and then the wheels are unlocked, the number of rotations of the drive wheels restoring the gripping is increased steeply from zero. If the phenomenon is misjudged as slipping of the drive wheels during the starting of the vehicle on the ice or the like, thereby prohibiting the shifting of the automatic transmission, and there is a possibility that over-revolution of the engine is produced. However, if the coupler slip rate detecting means detects that the drive wheels have been shifted from the locked state to the unlocked state, on the basis of the fact that the slip rate of the coupler is equal to or larger than the predetermined value, the shifting prohibition canceling means cancels the prohibition of the shifting by the shifting prohibiting means. Therefore, precise upshifting can be performed to prevent the over-revolution of the engine.

The predetermined value is set at 102% in the embodiment, but is not limited to 102% and may be a value which ensures that it can be detected that the drive wheels have been shifted from the locked state to the unlocked state. The coupler is a connecting mechanism provided between the engine and the automatic transmission. A torque converter is employed as the coupler in the embodiment, but the coupler may be a starting clutch and the like.

BRIEF DESCRIPTION OF THE DRAWINGS

The mode for carrying out the present invention will now be described by way of an embodiment shown in the accompanying drawings.

FIG. 14 is a time chart for explaining the operation when a shift lever is shifted from an R position to a D position.

DETAILED DESCRIPTION OF THE PREFERRED EMBODIMENT

Figure 1:
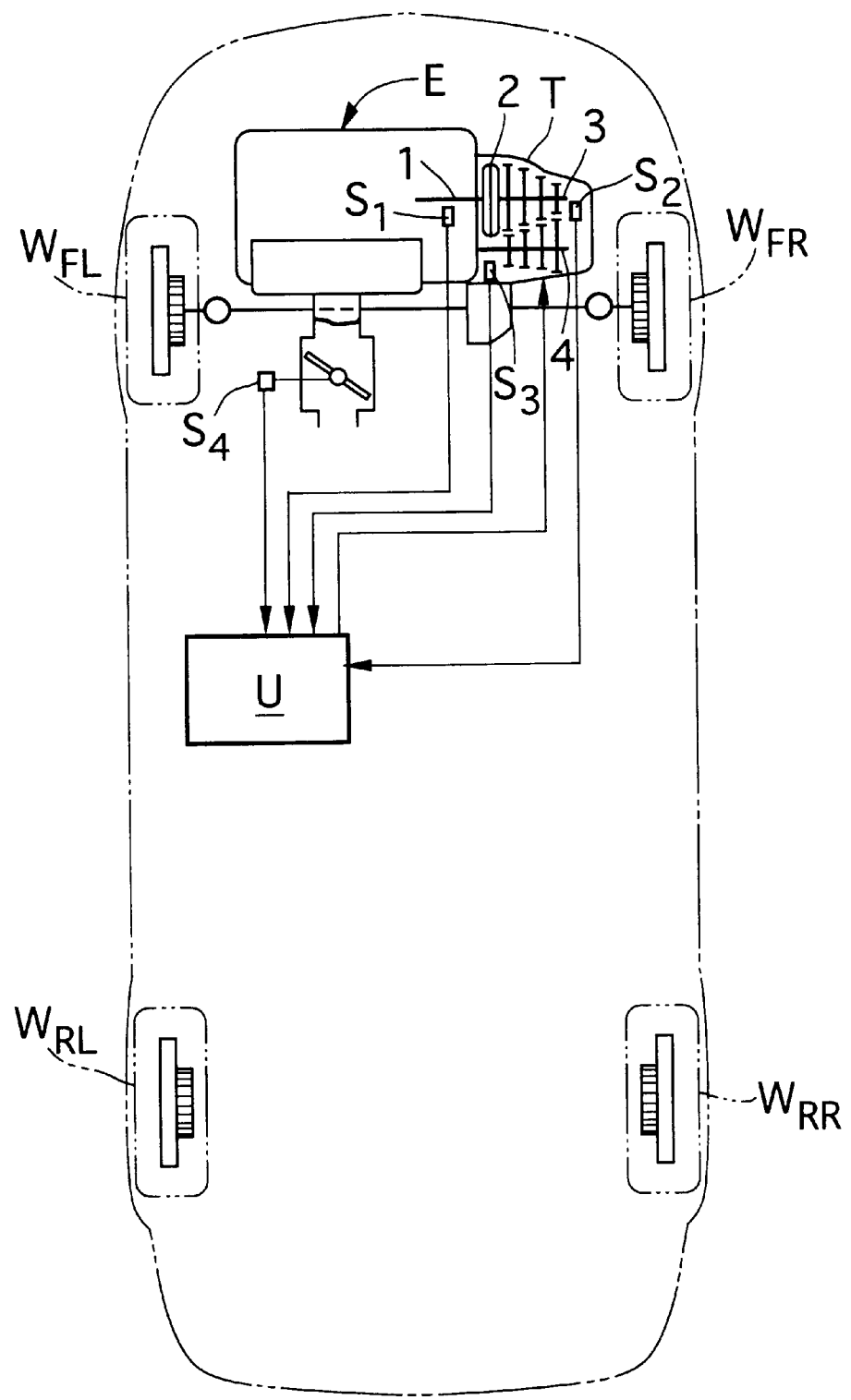
FIG. 1 is an illustration of the entire arrangement of a vehicle provided with a control system for an automatic transmission for the vehicle of the present invention.

As shown in FIG. 1, a front engine and front drive vehicle includes left and right drive wheels $W_{FL}$ and $W_{FR}$ driven by an engine E through an automatic transmission T and a differential D, and follower wheels $W_{RL}$ and $W_{RR}$ rotated with the traveling of the vehicle. An electronic control unit U receives a signal from an engine revolution-speed sensor $S_1$ for detecting a number of rotations per minute of a crankshaft 1 of the engine E (an engine revolution-speed Ne), a signal from an automatic transmission input rotation-speed sensor $S_2$ for detecting the speed of rotation of an input shaft 3 of the automatic transmission T connected to the engine E through a torque converter 2 (an automatic transmission input rotation-speed Nm), a signal from an automatic transmission output rotation-speed sensor $S_3$ for detecting the speed of rotation of an output shaft 4 of the automatic transmission T (an automatic transmission output rotation-speed Nc), and a signal from a throttle opening degree sensor $S_4$ for detecting the throttle opening degree which is the opening degree of a throttle valve mounted in an intake passage in the engine E. The electronic control unit U controls the gear shifting of the automatic transmission T on the basis of the signals from the engine revolution-speed sensor $S_1$, the automatic transmission input rotation-speed sensor $S_2$, the automatic transmission output rotation-speed sensor $S_3$ and the throttle opening degree sensor $S_4$. The automatic transmission output rotation-speed Nc is in a proportional relationship to the vehicle speed V and hence, the automatic transmission output rotation-speed sensor $S_3$ also serves as a vehicle speed sensor $S_3$ in this embodiment.

Figure 2:
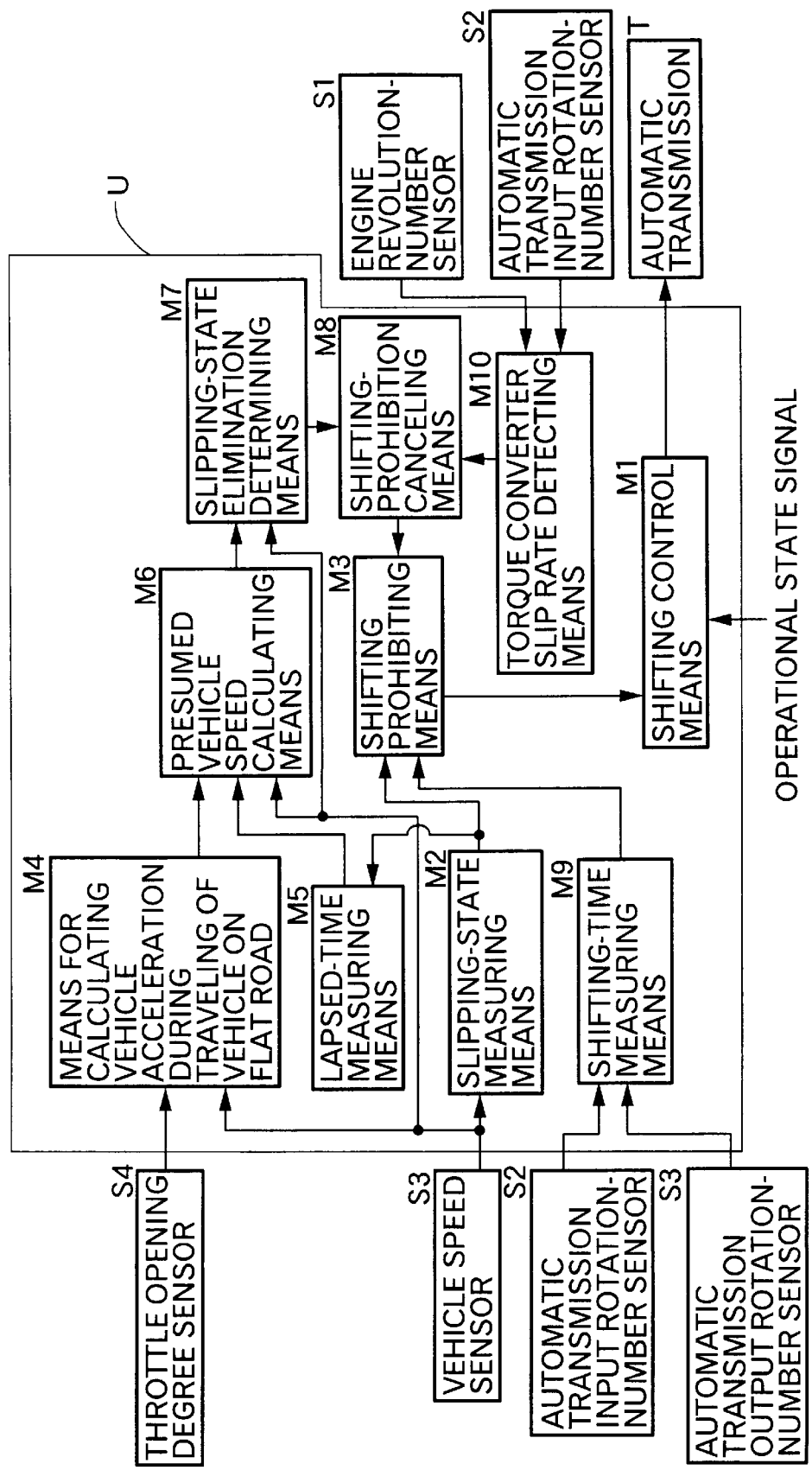
FIG. 2 is a block diagram of a control section of the present invention.

As shown in FIG. 2, the electronic control unit U includes a gear-shifting control means M1, a slipping-state determining means M2, a gear-shifting prohibiting means M3, a means M4 for calculating the acceleration of the vehicle during traveling on a flat road, a lapsed-time measuring means M5, a presumed-vehicle speed calculating means M6, a slipping-state canceling determining means M7, a gear-shifting prohibition canceling means M8, a gear-shifting time measuring means M9, and a torque converter slip rate detecting means M10.

The gear-shifting control means M1 controls the gear shifting of the automatic transmission T on the basis of operational state signals such as the engine revolution-speed, the absolute pressure within an intake pipe, the vehicle speed, the throttle opening degree, the gear shift stage and the like. The slipping-state determining means M2 determines the slipping state of the drive wheels $W_{FL}$ and $W_{FR}$ on the basis of the rate of variation in vehicle speed V detected by the vehicle speed sensor $S_3$. The gear-shifting prohibiting means M3 holds the gear shift stage at a second gear shift stage by prohibiting the upshifting of the automatic transmission by the gear-shifting control means M1 for a second predetermined time (e.g., for 500 msec.), when the slipping state of the drive wheels $W_{FL}$ and $W_{FR}$ have been determined, or when the time required for the upshifting from a first gear shift stage to the second gear shift stage and the time determined by a gear shifting time measuring means M9 (which will be described hereinafter) is shorter than a first predetermined time (e.g., 320 msec.).

The acceleration calculating means M4 calculates the acceleration of the vehicle on a flat road on the basis of the vehicle speed V detected by the vehicle speed sensor $S_3$, the throttle opening degree TH detected by the throttle opening degree sensor $S_4$, and a map which will be described hereinafter. The lapsed-time measuring means M5 measures the time lapsed from the determination of the slipping state by the slipping-state determining means M2. The presumed vehicle speed calculating means M6 calculates the amount of variation in vehicle speed corresponding to the lapsed time from the acceleration of the vehicle and the lapsed time, and calculates a presumed vehicle speed VYS from the amount of variation in vehicle speed and the vehicle speed V at the time when the slipping state is determined.

The slipping-state canceling determining means M7 determines the canceling of the slipping state by comparing the vehicle speed V with the presumed vehicle speed VYS. The gear-shifting prohibition canceling means M8 cancels the prohibition of the gear shifting by the gear-shifting prohibiting means M3, to permit the upshifting from the second gear shift stage, when the canceling of the slipping state is determined, or when it is detected by the torque converter slip-rate detecting means M10 (which will be described hereinafter) that the slip rate e of the torque converter 2 exceeds a predetermined value (e.g., 102%).

The gear-shifting time measuring means M9 measures the time required for the upshifting from the first gear shift stage to the second gear shift stage on the basis of the automatic transmission input rotation-speed Nm detected by the automatic transmission input rotation-speed sensor $S_2$ and the automatic transmission output rotation-speed Nc detected by the automatic transmission output rotation-speed sensor $S_3$. The time required for the upshifting from the first gear shift stage to the second gear shift stage is defined as the time from the time point when a first gear shift clutch starts the canceling of the engagement to the time point when a second gear shift clutch completes the engagement, and is measured as the time until the gear rate defined by Nm/Nc is changed from the gear ratio at the first gear shift stage to the gear ratio at the second gear shift stage.

The torque converter slip-rate detecting means M10 detects the slip rate e=Nm/Ne of the torque converter 2 on the basis of the engine revolution-speed Ne detected by the engine revolution-speed sensor $S_1$ (i.e., the rotation speed inputted to the torque converter 2) and the automatic transmission input rotation-speed Nm (i.e., the rotation speed outputted from the torque converter 2) detected by the automatic transmission input rotation-speed sensor $S_2$. When a driving force is transmitted from the engine E toward the drive wheels $W_{FL}$ and $W_{FR}$, the slip rate e is in a range of 0%<e<100%, but when the driving force is transmitted from the drive wheels $W_{FL}$ and $W_{FR}$ toward the engine E, such as during engine braking, the slip rate e is in a range of e>100%.

The operation of the embodiment of the present invention having the above-described arrangement will be described in further detail with reference to flow charts in FIGS. 3 to 7.

Prior to the description, the contents of reference characters used in the flow charts will be described below.

SPKU: Acceleration difference

HPKU: On-ice determination constant

VHYJL: Lower limit vehicle speed in carrying-out holding of a second gear shift stage VHYJH: Upper limit vehicle speed in carrying-out holding of a second gear shift stage HVYSH: Upper limit value of presumed vehicle speed $V_0$: Vehicle speed at the start of slipping VYS: Presumed vehicle speed ΔVYS: Amount of variation in presumed vehicle speed GGHH: Reference acceleration during traveling of the vehicle on a flat road at the second gear shift stage GGFH: Acceleration ratio resulting from the division of the reference acceleration during traveling of the vehicle on a flat road at the second gear shift stage by a reference acceleration during traveling of the vehicle on the flat road at the first gear shift stage HDELVH: Actual acceleration TH: Throttle opening degree TMA: On-ice determination timer TMTH: TH return timer TMHYJG: Delay timer for canceling the holding of the second gear shift stage TM234K: Timer for holding the second gear shift stage before an on-ice determination F_SLIP: Slip determining flag F_HYJ: On-ice determining flag F_THCL: Flag for determining the full-closing of the throttle F_SECHLD: Flag for determining the holding of the second gear shift stage out of on-ice F_TC: Flag for determining a slip rate of the torque converter First, at Step S1 of a main routine shown in FIGS. 3 and 4, it is determined whether the vehicle is traveling on ice having a small road surface friction coefficient. When the vehicle is traveling on ice, the on-ice determining flag F_HYJ is set at "1", whereby the upshifting from the second gear shift stage to the third gear shift stage is inhibited. When the vehicle is not on ice, the on-ice determining flag F_HYJ is cleared to "0", whereby the upshifting is permitted. The detail of the Step S1 will be described on the basis of an on-ice determining subroutine shown in FIG. 5.

First, the case where it is determined that the vehicle is on ice to set the on-ice determining flag F_HYJ at "1" will be described below. If the gear shift stage is not the third or fourth gear shift stage at Step S31 and the on-ice determining flag F_HYJ has been cleared to "0" at Step S32, the TH return timer TMTH is set at Step S33. If the vehicle speed V detected by the vehicle speed sensor $S_3$ is between the lower limit vehicle speed VHYJL for carrying out the holding of the second gear shift stage (e.g., 5 km/hr) and the upper limit vehicle speed VHYJH for carrying out the holding of the second gear shift stage (e.g., 120 km/hr) at subsequent Step S34, the processing is shifted to Step S35 at which it is determined whether the vehicle is traveling on ice which has a small road surface friction coefficient.

Figure 8:
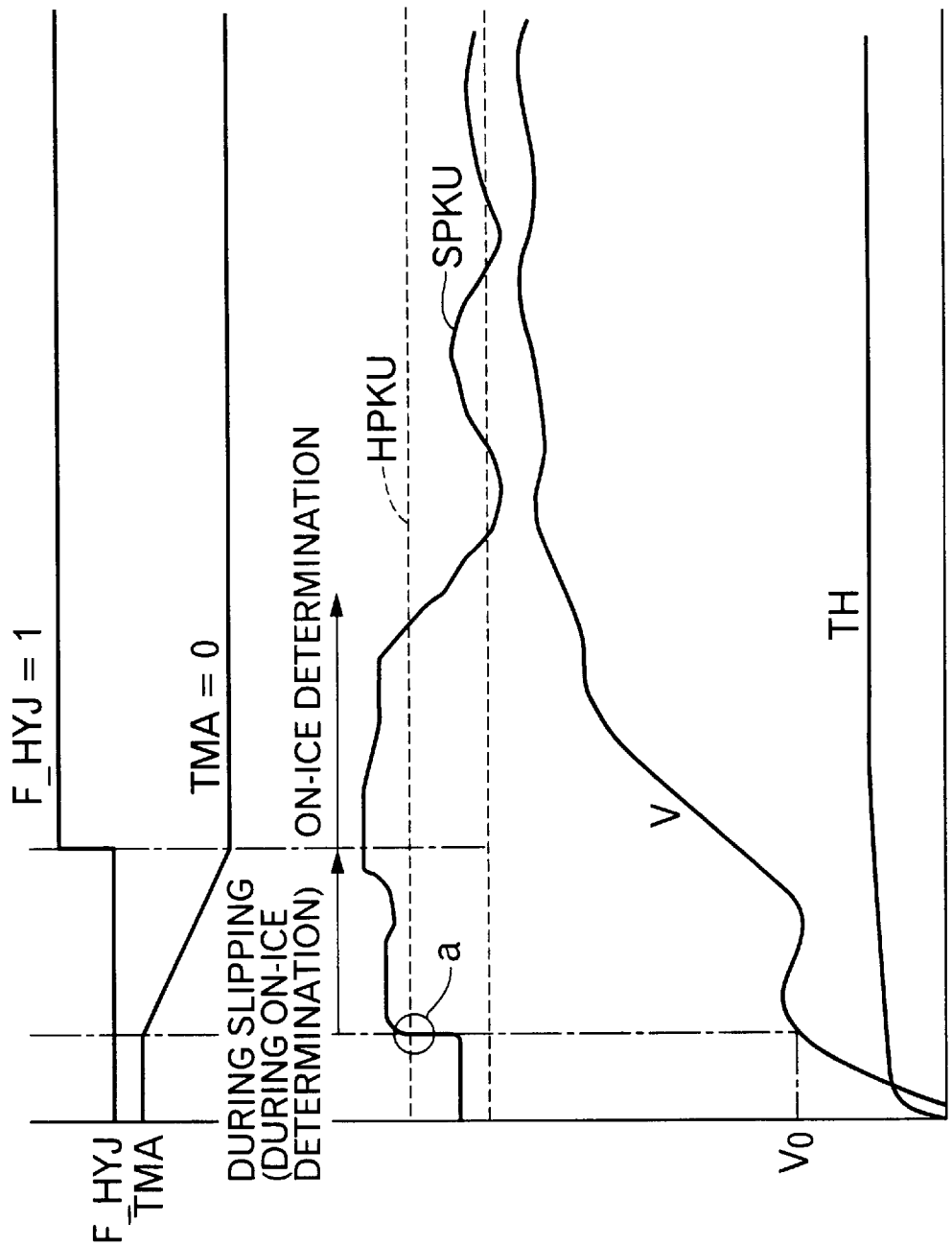
FIG. 8 is a time chart for explaining the start of the holding of a second gear shift stage due to a slipping.

Prior to the description referring to the flow chart, the description referring to FIG. 8 will be made. When a driver pushes down an accelerator pedal to start the vehicle, the drive wheel speed V is increased suddenly and unstably, if the drive wheels slip on the ice. At this time, when an acceleration difference SPKU which is a difference between the acceleration of the vehicle on ice and the acceleration of the vehicle during traveling of the vehicle on a usual flat road exceeds a predetermined on-ice determining constant HPKU (e.g., a variation in vehicle speed equal to 2.9 km/hr in the course of 240 msec) at a point a, the on-ice determining timer TMA is started. If the acceleration difference SPKU is larger than the on-ice determining constant HPKU at a point a during the counting operation of the on-ice determining timer TMA, i.e., if a larger acceleration is detected over a predetermined time due to the slipping of the drive wheels on ice having a smaller road surface friction coefficient, the on-ice determining flag F_HYJ is set at "1". In this manner, by use of the on-ice determining timer TMA, a momentary slipping produced when the vehicle body jumps or when the drive wheels run onto a wet iron plate, are prevented from being misjudged as slipping on ice.

This will be described with reference to the flow chart. First, at Step S35, the acceleration difference SPKU is calculated. The detail of the calculation of the acceleration difference SPKU is shown in a subroutine shown in FIG. 6. The calculation of the acceleration difference SPKU is carried out at intervals of 80 msec. First, if 80 msec has lapsed at Step S61, a reference acceleration GGHH generated during traveling of the vehicle at the second gear shift stage on a flat road, is searched at Step S62 on the basis of Gmap with the vehicle speed V and the throttle opening degree TH serving as parameters. At subsequent Step S63, an acceleration ratio GGFH resulting from the division of the reference acceleration GGHH generated during traveling of the vehicle at the second gear shift stage on the flat road by a reference acceleration generated during traveling of the vehicle at the first gear shift stage on the flat road, is searched on the basis of a ratio map with the vehicle speed V and the throttle opening degree TH serving as parameters. Then, at Step S64, a difference HDELVH between the this-time vehicle speed V and the last-time vehicle speed V (240 msec before) (namely, an actual acceleration) is calculated.

If the gear shift stage is not the first gear shift stage at next Step S65, i.e., if the gear shift stage is the second gear shift stage, GGHH (the reference acceleration generated during traveling of the vehicle at the second gear shift stage on the flat road) is subtracted from HDELVH (the actual acceleration at the second gear shift stage) at Step S67 to calculate an acceleration difference at the second gear shift stage. If the gear shift stage is the first gear shift stage at Step S65, HDELVH (the actual acceleration at the first gear shift stage) is multiplied at Step S66 by GGFH searched at Step S63 (the acceleration ratio determined by dividing the reference acceleration during traveling of the vehicle at the second gear shift stage on the flat road by the reference acceleration during the traveling of the vehicle at the first gear shift stage on the flat road) to calculate an actual acceleration HDELVH in the terms of a value at the second gear shift stage. At Step S67, the GGHH is subtracted from the actual acceleration HDELVH calculated in terms of the value at the second gear shift stage to calculate an acceleration difference SPKU corresponding to the second gear shift stage.

When the acceleration difference SPKU is calculated at Step S35 in the above manner, the acceleration difference SPKU is compared with the on-ice determining constant HPKU at Step S36. If the acceleration difference SPKU exceeds the on-ice determining constant HPKU, the processing is shifted to Step S37. If the slip-determining flag F_SLIP indicating that the drive wheels are slipping has been cleared to "0" at Step S37, the presumed vehicle speed VYS during the slipping is replaced by a current vehicle speed V (i.e., a vehicle speed $V_0$ at the time of generation of the slipping) as an initial value at Step S38, progressing to Step S41. On the other hand, if the slip determining flag F_SLIP has been already set at "1" at Step S37, a presumed vehicle speed VYS is calculated at Step S40, progressing to Step S41. The detail of the calculation of the presumed vehicle speed VYS will be described hereinafter on the basis of a subroutine shown in FIG. 7.

When the counting operation of the on-ice determining timer TMA is completed at Step S41, the slip determining flag F_SLIP is cleared to "0" at Step S42. If the gear shift stage is not a reverse gear shift stage at subsequent Step S43, it is determined that the vehicle is traveling on ice, whereby the on-ice determining flag F_HYJ is set at "1" at Step S44 and further, a torque converter slip rate determining flag F_TC which will be described hereinafter is cleared to "0" at Step S44A. If the acceleration difference SPKU is equal to or smaller than the on-ice determining constant HPKU at Step S36, the slip determining flag F SLIP is cleared to "0" at Step S45, and the on-ice determining timer TMA is set at Step S46.

Figure 9:
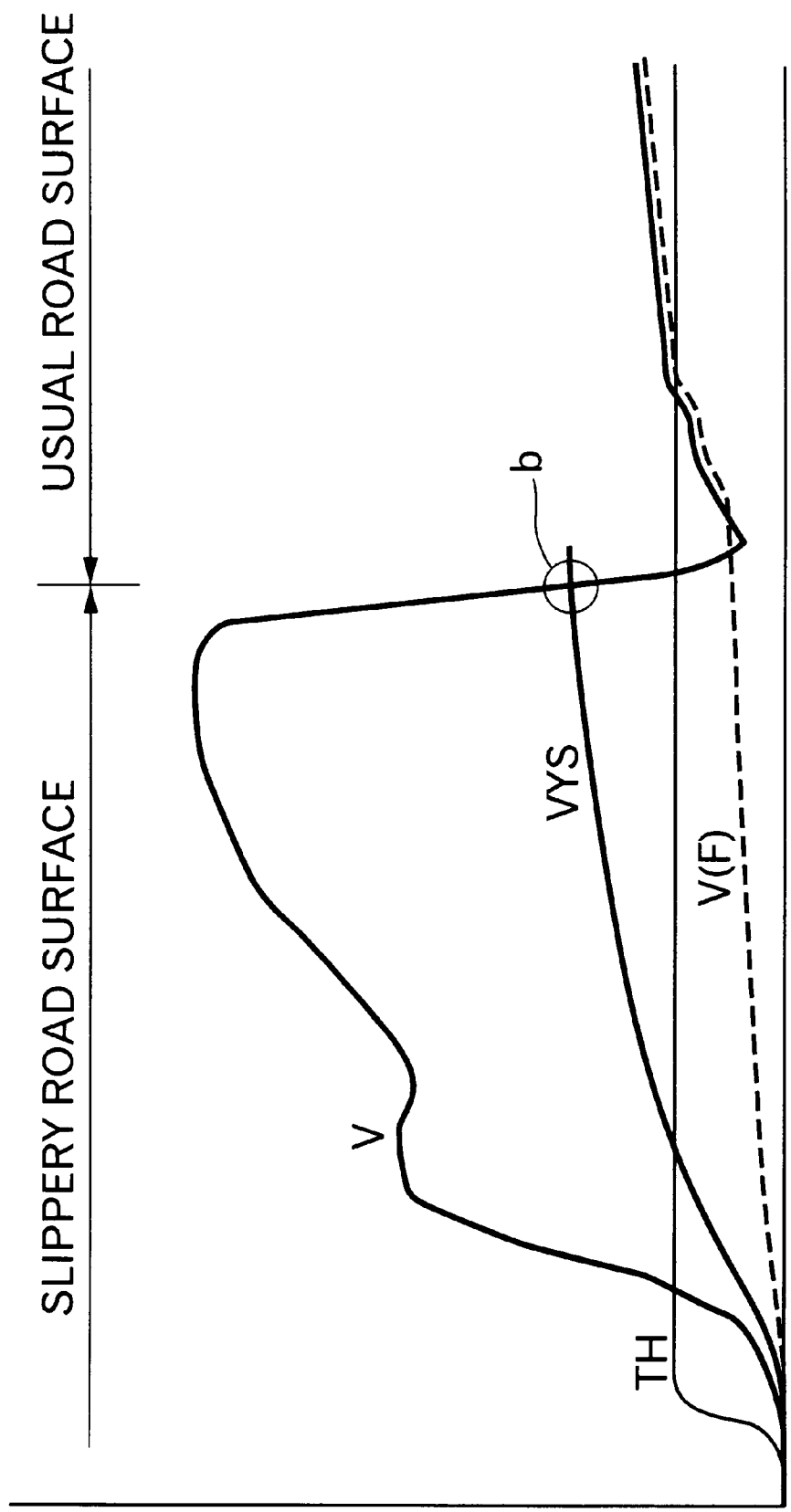
FIG. 9 is a time chart for explaining the canceling of the holding of the second gear shift stage by the convergence of the slipping.
Figure 10:
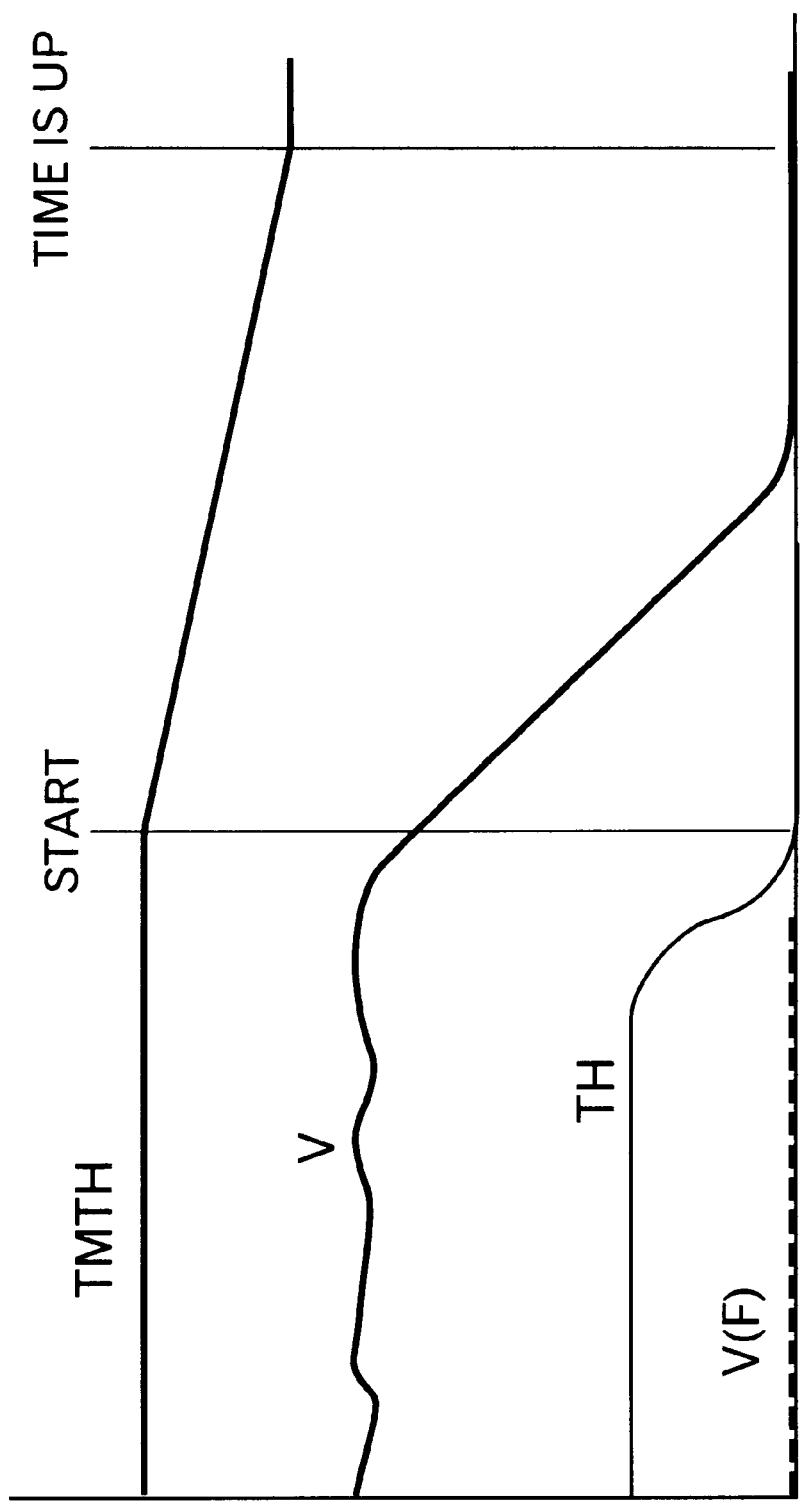
FIG. 10 is a time chart for explaining the canceling of the holding of the second gear shift stage by the full opening of a throttle.

The case where it is determined that the vehicle has been moved from on the ice onto a usual road, whereby the on-ice determining flag F HYJ is cleared to "0", will be first described with reference to FIG. 9. If the drive wheels slip with the starting on ice, the detected vehicle speed V is increased steeply, but the actual vehicle speed V(F) is increased only slightly. The actual vehicle speed V(F) during slipping of the drive wheels cannot be detected and hence, a presumed vehicle speed VYS in a case where it is supposed that the vehicle has started on a usual flat road, is calculated. When the vehicle is moved from on the ice onto the usual road surface, to reduce the slipping, and the detected vehicle speed V is reduced to become equal to or lower than the presumed vehicle speed VYS, i.e., when a relation, $V \leq VYS$ is established at a point b in FIG. 9, it is determined that the drive wheels grip the road surface, whereby the slipping is stopped, and the on-ice determining flag F_HYJ is cleared to "0".

This will be further described with reference to the flow chart. If the on-ice determining flag F_HYJ is set at "1" at Step S32 and the throttle opening degree is equal to or larger than a fully-closed throttle opening degree CTH at Step S47, the throttle return timer TMTH is set at Step S48, and a presumed vehicle speed VYS is calculated at Step S49 according to the same subroutine as at Step S40. If the presumed vehicle speed VYS is equal to or higher than the vehicle speed V at Step S50, it is determined that the slipping has been stopped, whereby the on-ice determining flag F_HYJ is cleared to "0" at Step S52, and the on-ice determining timer TMA is set at Step S53.

When the throttle opening degree becomes equal to the fully-closed throttle opening degree at Step S47, the throttle return timer TMTH set at Step S48 in the last-time loop, starts the counting. When a predetermined time (e.g., 2 sec) has lapsed at Step S51, the on-ice determining flag F_HYJ is cleared to "0" at Step S52. This is because if two seconds have lapsed after the throttle opening degree became equal to the fully-closed throttle opening degree CTH, the slipping is subsided by a reduction in driving force and hence, it is unnecessary to hold the second gear shift stage.

The calculation of the presumed vehicle speed VYS at Steps S40 and S49 will be described with reference to the flow chart in FIG. 7. First, if 240 msec has lapsed at Step S71, a reference acceleration GGHH during traveling of the vehicle at the second gear shift stage on the usual flat road is searched at Step S72 on the basis of Gmap with the presumed vehicle speed VYS and the throttle opening degree TH as parameters. If the gear shift stage is the first gear shift stage at subsequent Step S73, GGFH which is an acceleration ratio determined by dividing the reference acceleration during traveling of the vehicle at the second gear shift stage on the flat road by the reference acceleration during traveling of the vehicle at the first acceleration on the flat road, is searched on the basis of the ratio map with the presumed vehicle speed VYS and the throttle opening degree TH as parameters. If the gear shift stage is the second gear shift stage rather than the first gear shift stage at Step S73, the acceleration ratio GGFH is set at 1 at Step S75.

Then, the reference acceleration GGHH corresponding to the second gear shift and searched at Step S72 is divided by the acceleration ratio GGFH searched at Step S74 to calculate an amount $\Delta$VYS of variation in presumed vehicle speed corresponding to the first gear shift at Step S76. In this case, if the gear shift stage is the second gear shift stage, a value calculated by multiplying the reference acceleration GGHH corresponding to the second gear shift stage by 1 set at Step S75 is defined as an amount $\Delta$VYS of variation in presumed vehicle speed corresponding to the second gear shift stage.

If the amount $\Delta$VYS of variation in presumed vehicle speed is positive at subsequent Step S77 and the current throttle opening degree TH is equal to or larger than $0.6/8$ at Step S78, a value calculated by adding an amount $\Delta$V of variation in presumed vehicle speed to the presumed vehicle speed VYS is defined as a new presumed vehicle speed VYS at Step S79. If the presumed vehicle speed VYS exceeds the upper limit value HVYSH (e.g., 100 km/hr) of the presumed vehicle speed at Step S80, such upper limit value HVYSH (e.g., 100 km/hr) of the presumed vehicle speed is used as the presumed vehicle speed VYS at Step S81. If the throttle opening degree TH is smaller than $0.6/8$ at Step S78, the calculation of the presumed vehicle speed VYS at Steps S79 to S81 is not carried out. It should be noted that $V_0$ (see FIG. 8) which is a vehicle speed V at the start of slipping, namely, a vehicle speed V at a moment when the acceleration difference SPKU exceeds the on-ice determining constant HPKU, is used as an initial value of the presumed vehicle speed VYS.

Figure 3:
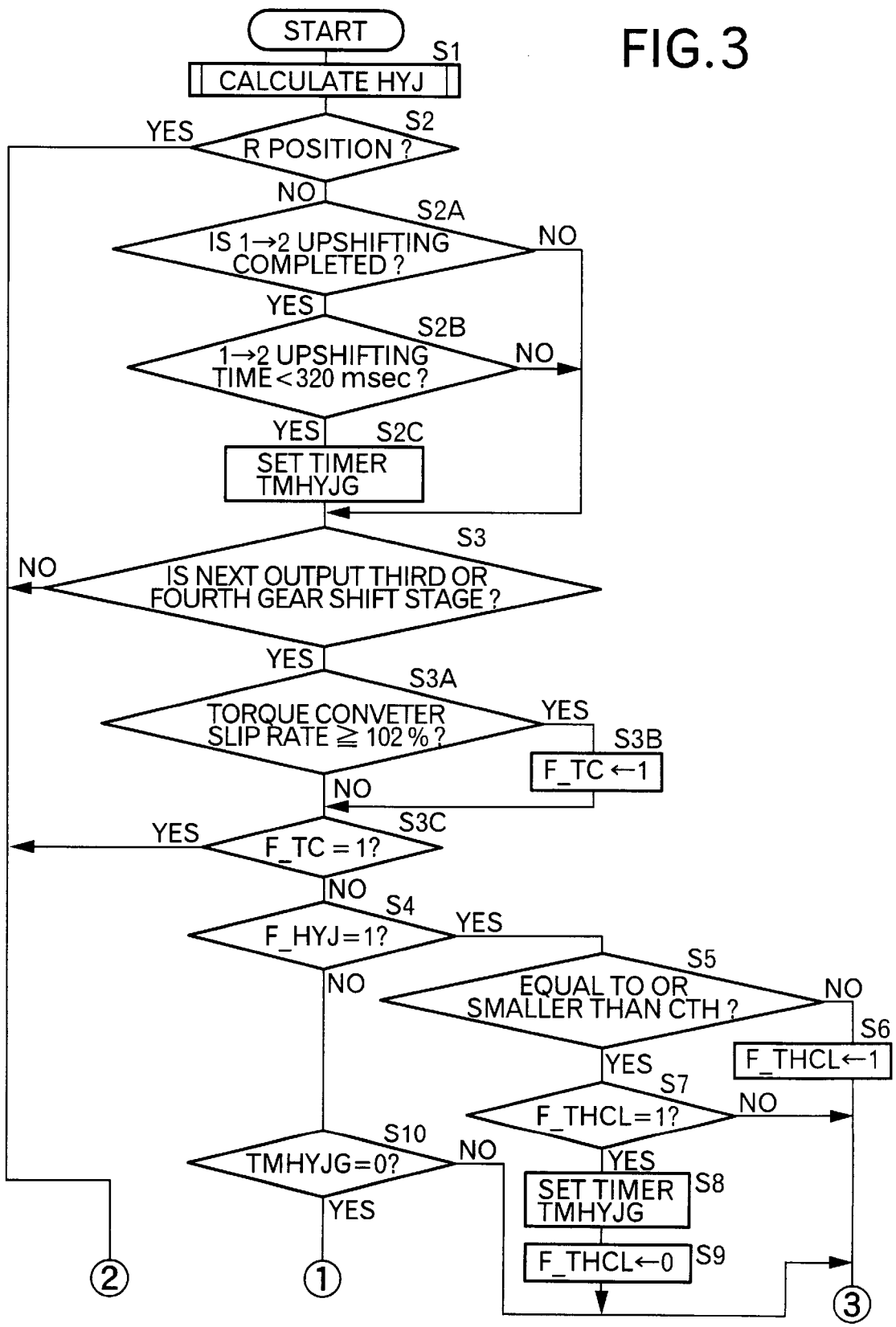
FIG. 3 is a first portion of a flow chart for a main routine thereof.
Figure 4:
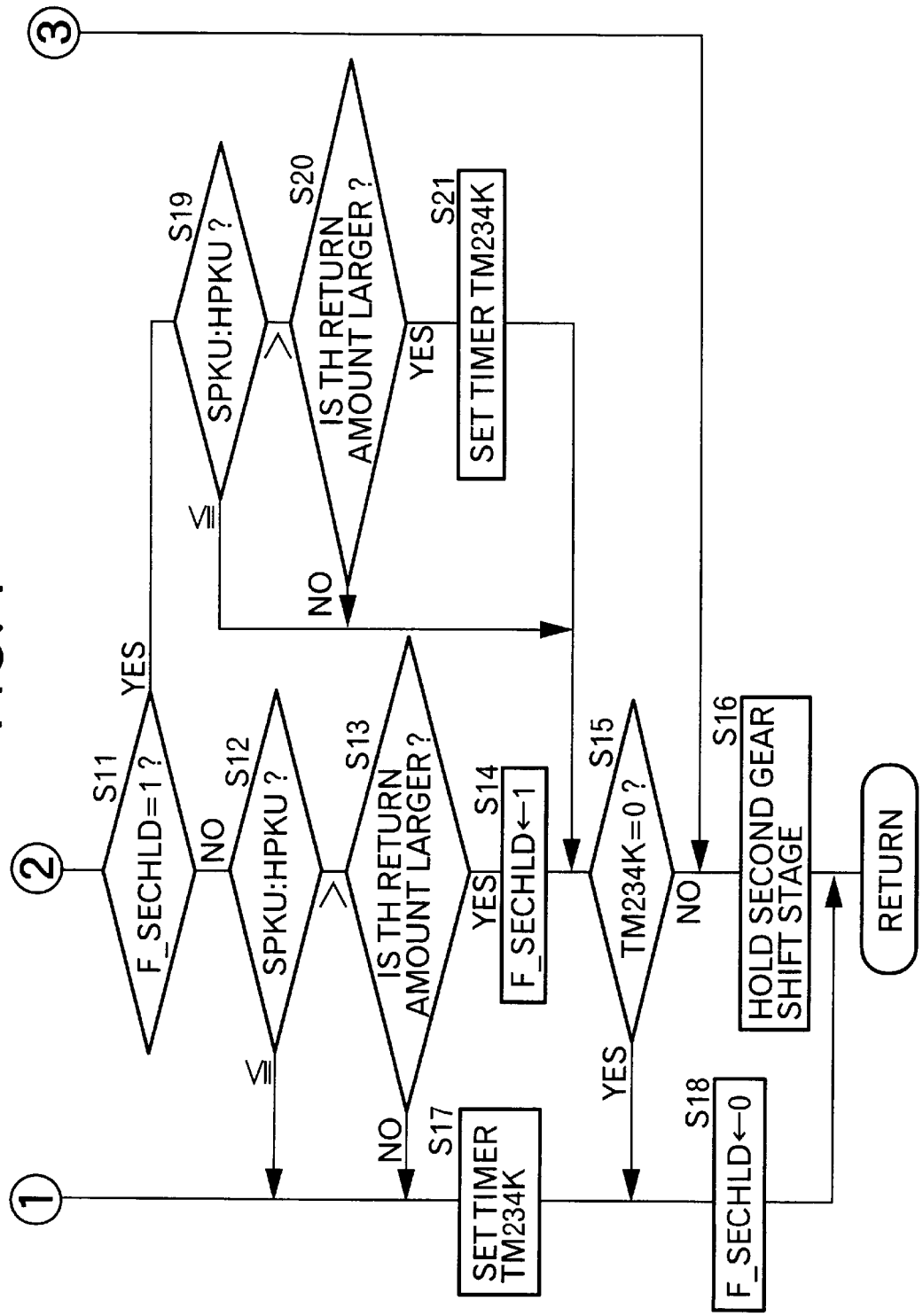
FIG. 4 is a second portion of the flow chart for the main routine thereof.
Figure 5:
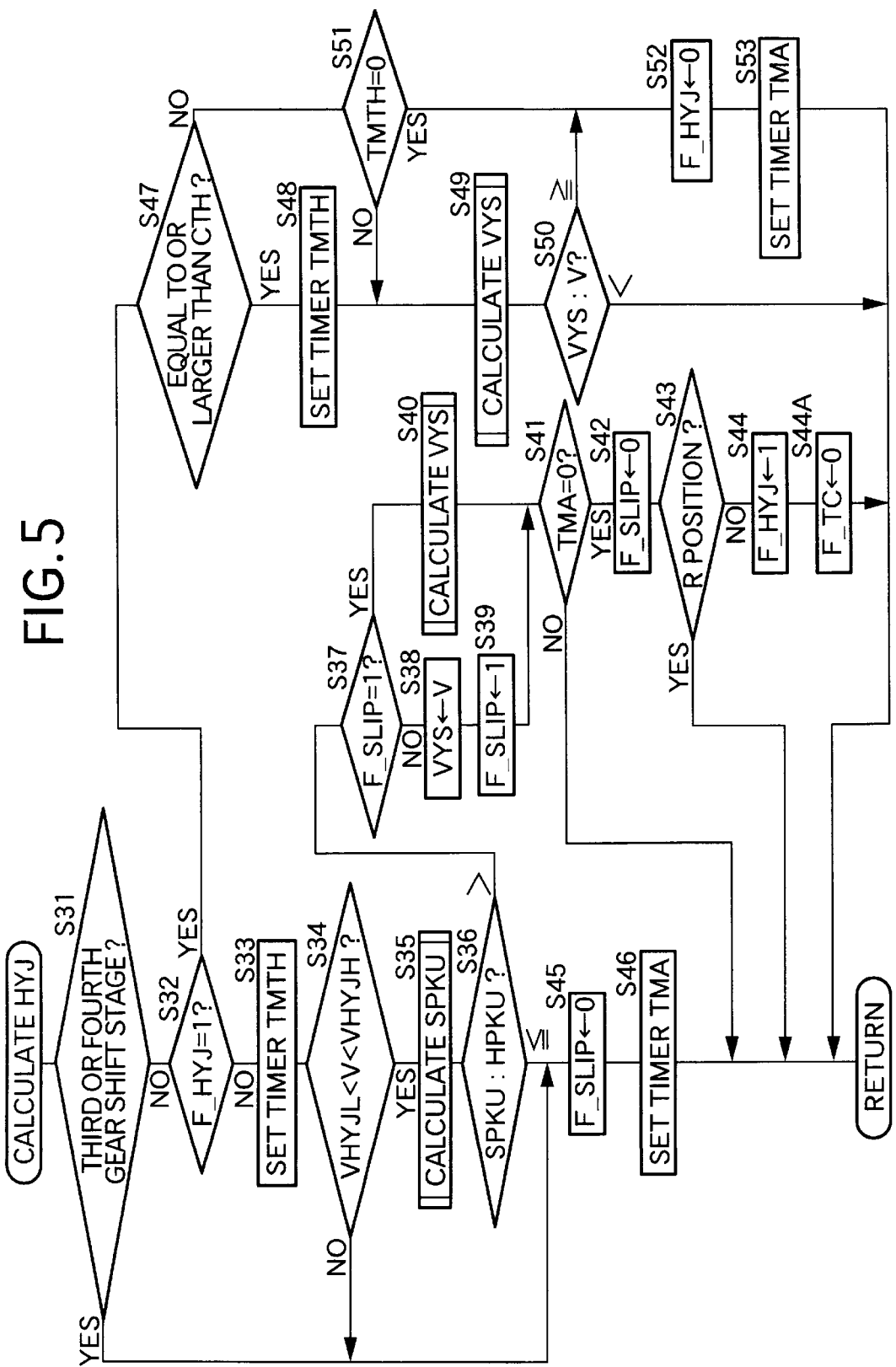
FIG. 5 is a flow chart for an on-ice determining routine of the present invention.

In the above manner, the on-ice determination at Step S1 in the main routine shown in FIG. 3 is carried out. As a result, if the on-ice determining flag F_HYJ is set at "1" or reset at "0", the processing is advanced to Step S2. When the gear shift stage is not the reverse gear shift stage at Step S2, the processing is advanced to Step S2A, at which it is determined whether the upshifting from the first gear shift stage to the second gear shift stage in the current-time loop has been completed. If the upshifting in the current-time loop has been completed, the shifting time for the upshifting measured by the shifting time measuring means M9 is compared with 320 msec at Step S2B. The time required for the on-ice determination at Step S1 is 320 msec. If the shifting time is shorter than 320 msec at Step S2B, i.e., if the upshifting from the first gear shift stage to the second gear shift stage has been completed before lapsing of the time required for the on-ice determination, a delay timer TMHYJG for canceling the holding of the second gear shift stage which will be described hereinafter, is set at Step S2C.

By the fact that if the shifting time is shorter than 320 msec at Step S2B, the delay timer TMHYJG for canceling the holding of the second gear shift stage is set, as described above, the holding of the second gear shift stage at Step S16 is continued, until a counting time of 500 msec has lapsed to complete the counting operation of the delay timer TMHYJG at Step S10, and thus, the upshifting from the second gear shift stage to the third gear shift stage is prohibited to avoid the damaging of the differential D.

When the vehicle slips immediately after the starting thereof on ice, the holding of the second gear shift stage is in time, even if it is carried out after 320 msec required for the on-ice determination at Step S1. However, if the vehicle slips during the upshifting from the first gear shift stage to the second gear shift stage, the upshifting from second gear shift stage to the third gear shift stage is started immediately after completion of the upshifting from the first gear shift stage to the second gear shift stage due to a steep increase in pseudo vehicle speed V detected by the vehicle speed sensor $S_4$ and hence, there is a possibility that the holding of the second gear shift stage based on the on-ice determination is not in time. Thereupon, it is noticed that when the driving wheels $W_{FL}$ and $W_{FR}$ are in their slipping states, the load required for engagement of the second gear shift clutch of the automatic transmission T is smaller than the load on the usual road surface and for this reason, the upshifting is completed in a short time. Thus, when the shifting time required for the upshifting from the first gear shift stage to the second gear shift stage during slipping of the wheels is shorter than a predetermined time (e.g., 320 msec), it can be determined that slipping has been produced during the upshifting from the first gear shift stage to the second gear shift stage.

In this way, when slipping is produced during the upshifting from the first gear shift stage to the second gear shift stage, the holding of the second gear shift stage is forcibly continued until 500 msec has lapsed which is the counting time of the delay timer for canceling the holding of the second gear shift stage, whereby the undesirable upshifting from the second gear shift stage to the third gear shift stage can be reliably prevented.

If the vehicle is in an operational state in which the upshifting is to be carried out and the next output of a shifting command indicates the third or fourth gear shift stage at a subsequent Step S3, the processing is advanced to Step S3A. The slip rate e of the torque converter 2, detected by the torque converter slip rate detecting means M10, is compared with 102% at Step S3A. If $e \geq 102\%$, the torque converter slip determining flag F_TC is set at "1" at Step S3B. If the torque converter slip determining flag F_TC has been set at "1" at Step S3C, the processing is shifted to Step S17. If the torque converter slip determining flag F_TC has been cleared to "0" at Step S3C, the processing is advanced to Step S4.

When the vehicle traveling at a high speed on the usual road surface is braked hard, to lock the drive wheels $W_{FL}$ and $W_{FR}$, the automatic transmission T is downshifted to the first gear shift stage. When the braking is released from this state, the speed of rotation of the drive wheels $W_{FL}$ and $W_{FR}$ is suddenly restored by the friction against the road surface and hence, the pseudo vehicle speed V detected by the vehicle speed sensor $S_4$ steeply rises from zero. If this phenomenon is misunderstood as the slipping of the drive wheels $W_{FL}$ and $W_{FR}$ upon the starting of the vehicle on ice, the upshifting from the second gear shift stage to the third gear shift stage is prohibited. For this reason, there is a possibility that the engine is over-revolution.

In order to discriminate the steep rising of the vehicle speed V resulting from the locking and then unlocking of the drive wheels $W_{FL}$ and $W_{RR}$ from the steep rising of the vehicle resulting from the slipping of the drive wheels $W_{FL}$ and $W_{RR}$ upon the starting of the vehicle on ice, the slip rate of the torque converter 2 is utilized. More specifically, when the drive wheels $W_{FL}$ and $W_{RR}$ are shifted from the locked state to the unlocked state, the driving force is transmitted from the drive wheels $W_{FL}$ and $W_{RR}$ toward the engine E. Therefore, when the automatic transmission input rotation-speed Nm is larger than the engine rotation-speed Ne and the slip rate e of the torque converter 2 is equal to or larger than 102% which is the predetermined value, it is determined that the drive wheels $W_{FL}$ and $W_{RR}$ have been shifted from the locked state to the unlocked state and thus, the processing is shifted from Step S3C to Step S17. As a result, the holding of the second gear shift stage at Step S16 is not carried out, whereby the upshifting from the second gear shift stage to the third gear shift stage is permitted to prevent the over-revolution of the engine E.

Figure 11:
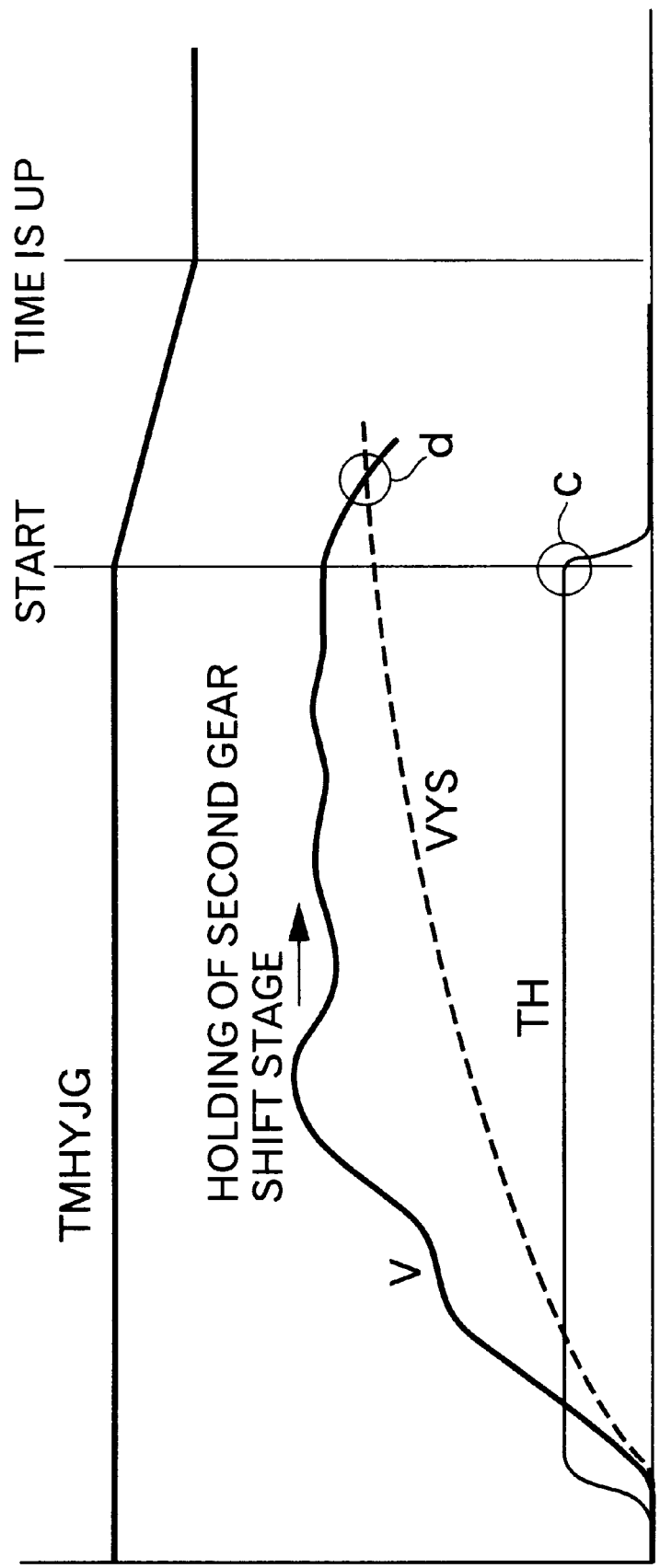
FIG. 11 is a time chart for explaining the inhibition of the canceling of the holding of the second gear shift stage by a second-gear shift stage canceling delay timer TMYJG.

Now, when the on-ice determining flag F_HYJ has been set at "1" at Step S4 to indicate that the vehicle is traveling on ice having a smaller road surface friction coefficient, the gear shift stage is held at the second gear shift stage at Step S16 after passing through Steps S5 to S9. When the accelerator pedal is returned at that time, there is a problem in that the holding of the second gear shift stage is released, and a undesirable upshifting is carried out. This will be described below with reference to FIG. 11. When the driver continues to depress the accelerator pedal in a state in which a slipping has been produced upon the starting of the vehicle on ice, the presumed vehicle speed VYS is gradually increased to approach the vehicle speed V. For this reason, there arises a problem that when the accelerator is returned at a point c, the vehicle speed V becomes equal to lower than the presumed vehicle speed VYS at a point d, whereby the holding of the second gear shift stage is released, permitting the upshifting to be carried out. Therefore, when the throttle opening degree TH becomes a fully-closed value in a state in which the on-ice determining flag F_HYJ has been set at "1", the releasing of the holding of the second gear shift stage is inhibited, until the counting operation of the second gear shift-holding canceling delay timer TMHYJG is completed. Thus, the undesirable upshifting can be avoided.

This will be further described with reference to the flow chart. At Steps S5 to S9, when the throttle opening degree TH becomes the fully-closed value in the state in which the on-ice determining flag F_HYJ has been set at "1", the second gear shift-holding canceling delay timer TMHYJG is set. More specifically, the throttle fully-closed opening degree determining flag F_THCL is set at "1" at Step S6, when the throttle opening degree TH is not the fully-closed value at Step S5. If the throttle fully-closed opening degree determining flag F_THCL is "1" at Step S7 when the throttle opening degree TH becomes the fully-closed value at Step S5, namely, as soon as the throttle opening degree TH becomes the fully-closed value, the second gear shift-holding canceling delay timer TMHYJG is set at Step S8, and the throttle fully-closed opening degree determining flag F_THCL is cleared to "0" at Step S9.

When the on-ice determining flag F_HYJ is cleared to "0" at Step S4 due to the elimination of the slipping, the gear shift stage is held at the second gear shift stage at Step S16, until 500 msec has lapsed to complete the counting time of the second gear shift-holding canceling delay timer TMHYJG at Step S10, whereby the upshifting to the third gear shift stage is inhibited until 500 msec has lapsed.

Figure 12:
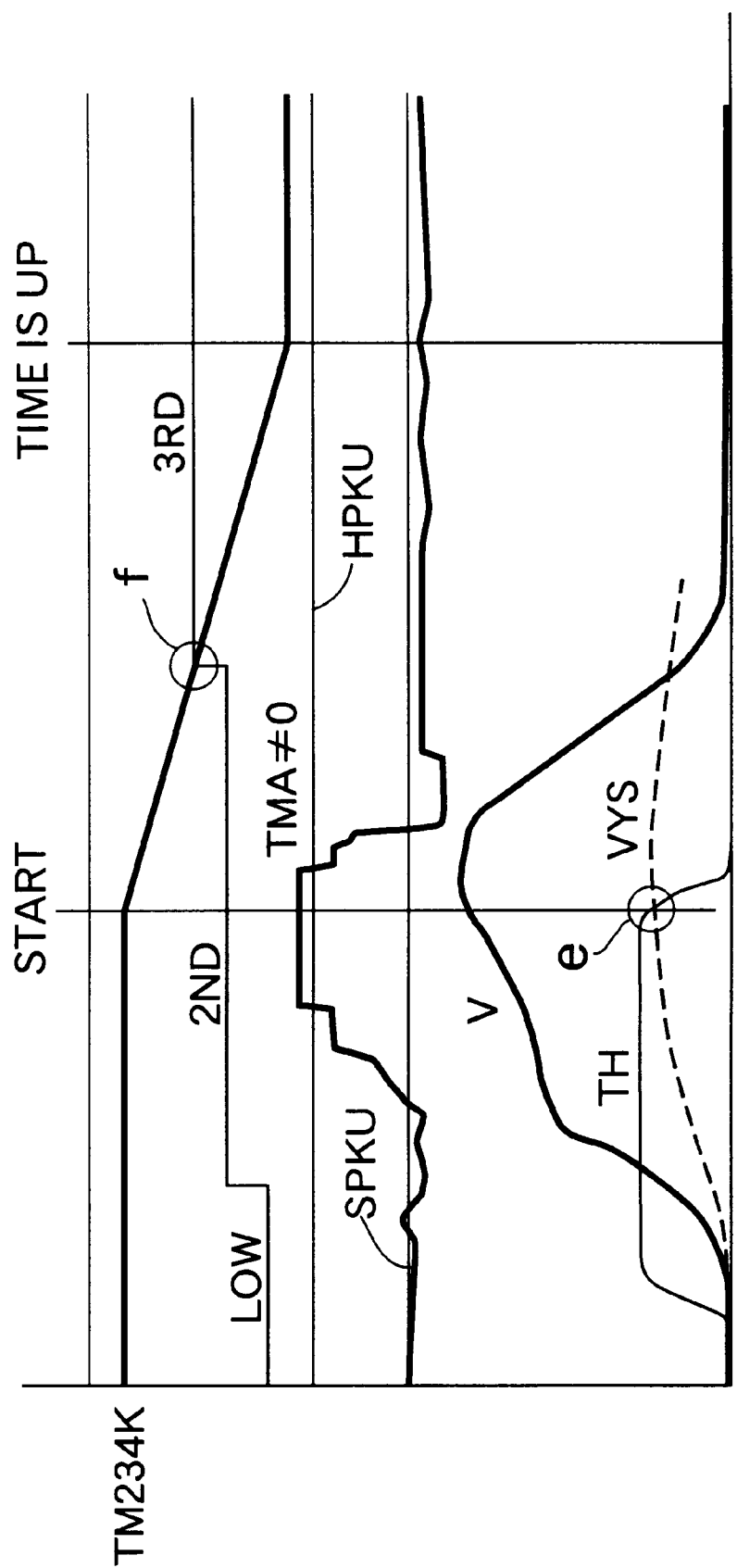
FIG. 12 is a time chart for explaining the inhibition of the canceling of the holding of the second-gear shift stage by a timer TM234K for holding the second gear shift stage before an on-ice-determination.

Now, if the accelerator pedal is returned, when the on-ice determination is still not carried out at Step S4 and hence, when the on-ice determining flag F_HYJ is in the state in which it has been cleared to "0", there is a possibility that the undesired upshifting is carried out. More specifically, if the throttle opening degree is reduced at a point e in FIG. 12, after the on-ice determining timer TMA has started the counting on the basis of the fact that the acceleration difference SPKU exceeds the on-ice determining constant HPKU with the starting of the vehicle on ice and before the on-ice determining timer TMA completes the counting, the undesirable upshifting is produced at a point f. Thereupon, the counting operation of the timer TM23K for holding the second gear shift stage before the on-ice determination, is started simultaneously with the reduction in throttle opening degree TH, whereby the upshifting is inhibited until the counting of the timer TM23K is completed.

This will be further described with reference to the flow chart. If the acceleration difference SPKU is equal to or smaller than the on-ice determining constant HPKU at Step S12 to indicate the generation of no slipping, or if the return amount of the throttle opening degree is smaller (e.g., equal to or smaller than an opening degree of $3/8$) at Step S13 in a state in which the on-ice determining flag F_HYJ has been cleared to "0" at Step S4; the counting time of the second gear shift-holding canceling delay timer TMHYJG is up at Step S10, and a flag F_SECHLD (which will be described hereinafter) for determining the holding of the second gear shift stage out of on the ice has been cleared to "0" at Step S11, the holding of the second gear shift stage at Step S16 is not carried out by returning of the processing via Steps S17 and S18.

However, if the acceleration difference SPKU exceeds the on-ice determining constant HPKU at Step S13 to indicate the generation of the slipping and the return amount of the throttle opening degree TH is larger at Step S14, the flag F_SECHLD for determining the holding of the second gear shift stage out of on the ice is set at "1" at Step S14 and then, the gear shift stage is held at the second gear shift stage at Step S16, until the counting of the second gear shift stage holding timer TM234K is completed at Step S15.

In the next loop, the flag F_SECHLD for determining the holding of the second gear shift stage out of on the ice has been already set at "1" at Step S11 and hence, the processing is shifted to Step S19. While the vehicle is in the state in which the acceleration difference SPKU exceeds the on-ice determining constant HPKU at Step S19 to indicate the generation of the slipping and the return amount of the throttle opening degree TH is larger at Step S20, the timer TM234K for holding the second gear shift stage before the on-ice determination, is set each time at Step S21. If the acceleration difference SPKU becomes equal to or smaller than the on-ice determining constant HPKU at Step S19, or if the return amount of the throttle opening degree TH is smaller at Step S20, the second gear stage holding timer TM234K starts the counting at Step S15. If the counting of the second gear stage holding timer TM234K is completed, the processing is shifted to Step S18, at which the second gear shift-holding determining flag F_SECHLD is cleared to "0", whereby the holding of the second gear shift stage is released.

Figure 13:
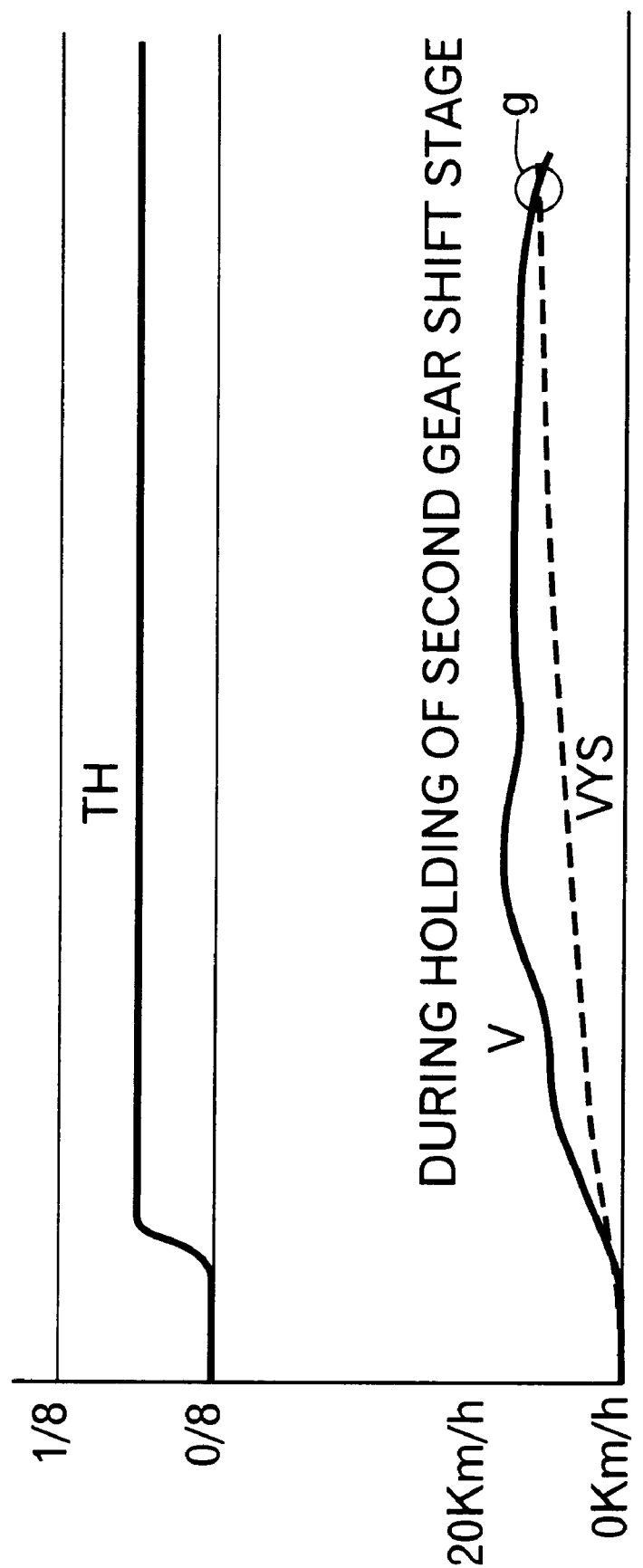
FIG. 13 is a time chart for explaining the inhibition of the canceling of the holding of the second gear shift stage at a lower throttle opening degree.

At a throttle opening degree TH equal to or smaller than $1/8$, there is no great difference between the acceleration on the ice and the acceleration on the usual road surface. For this reason, as shown in FIG. 13, a line of vehicle speed V and a line of presumed vehicle speed VYS are closer to each other, and cross each other at a point g, whereby the undesirable releasing of the holding of the second gear shift stage may be produced in some cases. Therefore, as described at Step S78 in the flow chart in FIG. 7, the calculation of the presumed vehicle speed VYS is not carried out at a throttle opening degree TH lower than $0.6/8$, and the presumed vehicle speed VYS is fixed at the value $V_0$, which is the vehicle speed at the start of slipping. Thus, the undesirable upshifting can be avoided.

The vehicle speed sensor S3 for detecting the vehicle speed V on the basis of the speed of rotation of the rotatable member of the automatic transmission T is incapable of judging the rotating direction of the rotatable member (namely, whether the vehicle is traveling forwards or in reverse). For this reason, if the shift lever is shifted from the R position to the D position in a state in which the vehicle is traveling in reverse at a high speed, there is a possibility that the third or fourth gear shift stage is established without establishment of the first gear shift stage. At the shifting of the shift lever from the R position to the D position, a third/fourth gear shift stage prohibiting timer TMRDHYJ is started as shown in FIG. 14, thereby prohibiting the upshifting to the third or fourth gear shift stage for a predetermined time (e.g., 2 sec).

In place of the throttle opening degree TH, an accelerator opening degree which is an amount of operation of the accelerator pedal, may be used.

Figure 6:
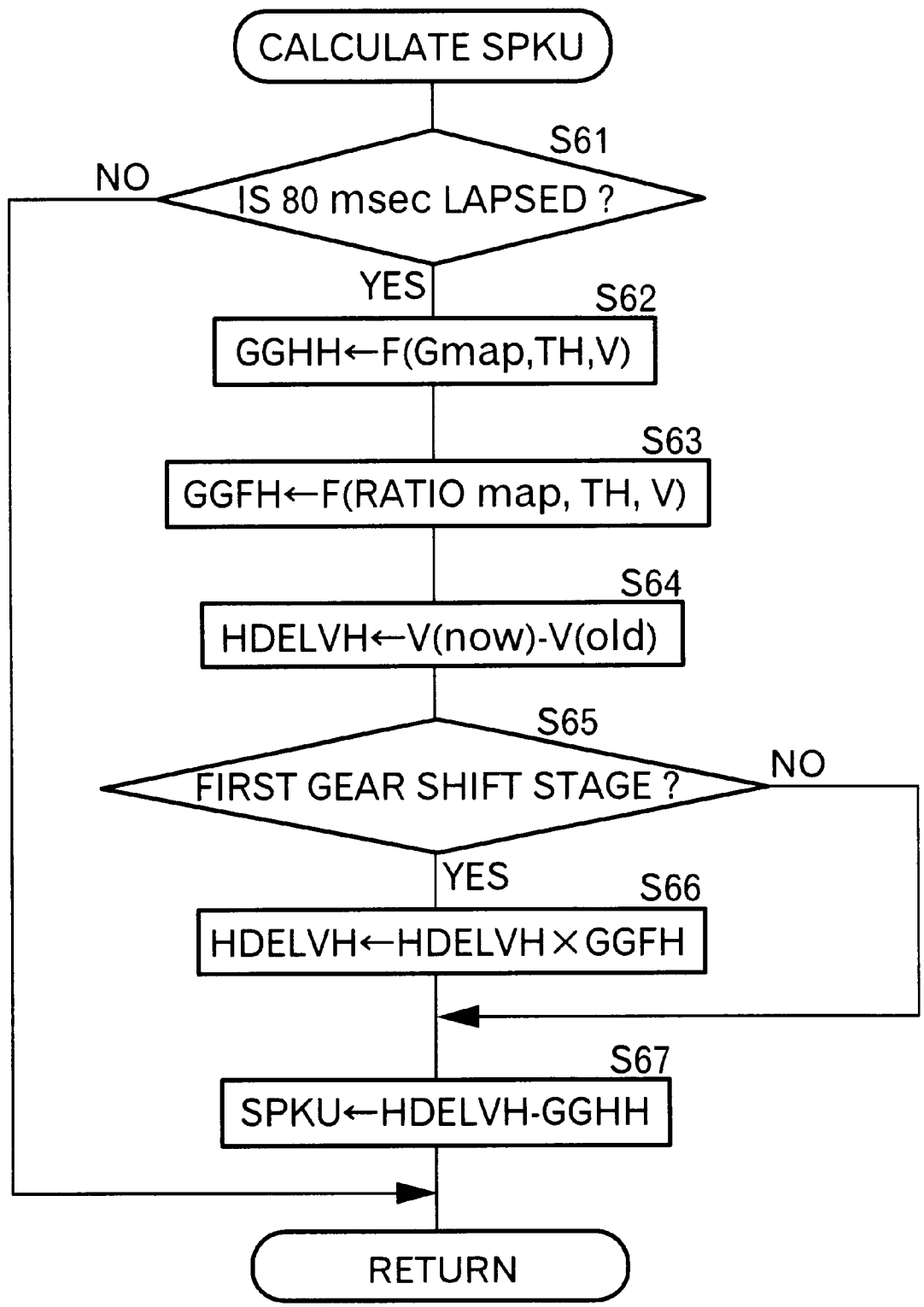
FIG. 6 is a flow chart for an acceleration difference calculating routine of the present invention.
Figure 7:
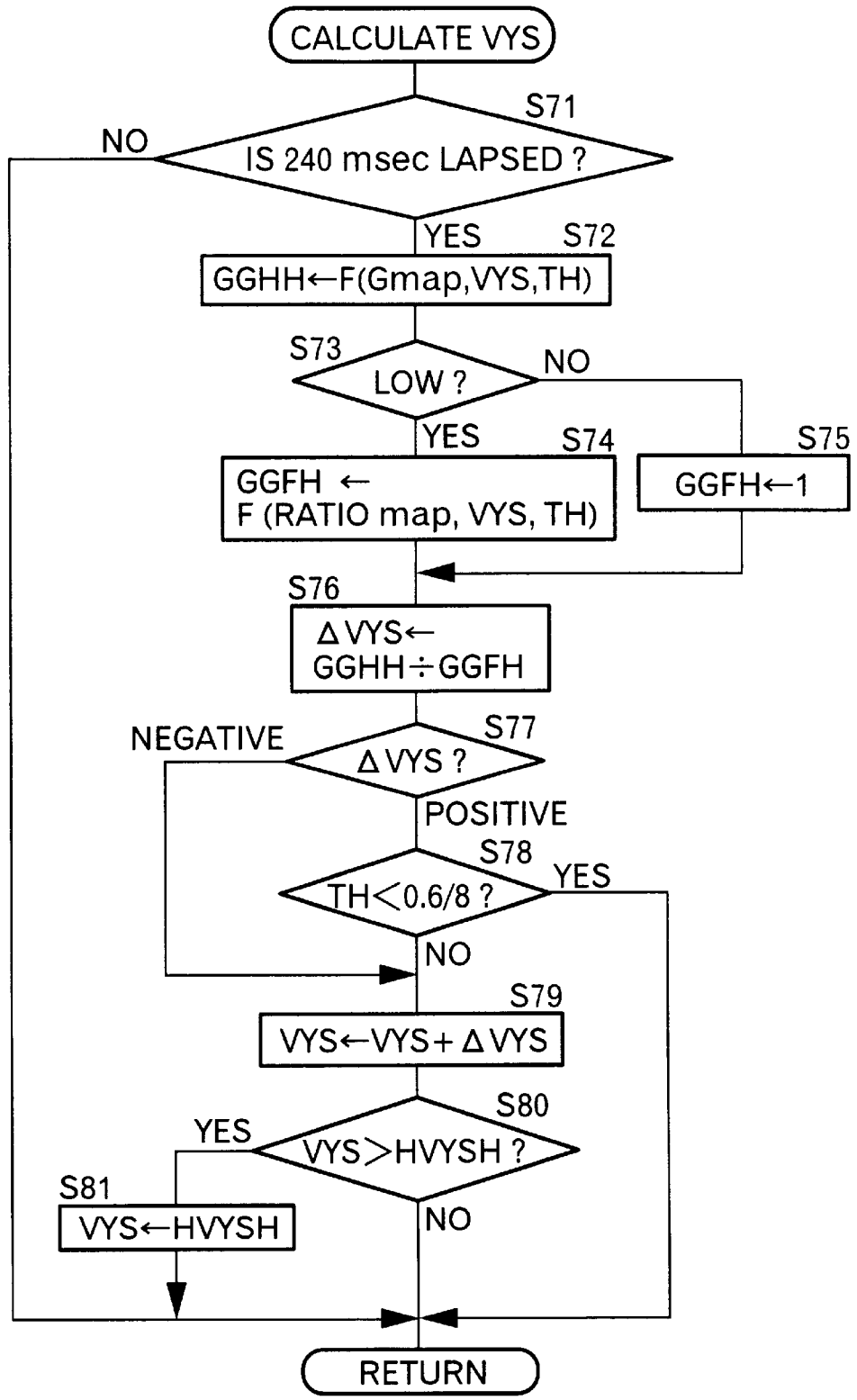
FIG. 7 is a flow chart for a presumed-vehicle speed calculating routine of the present invention.

Further, although a ratio map has been used for the calculation of the acceleration difference SPKU or the calculation of the presumed vehicle speed VYS in the flow chart in FIGS. 6 and 7, a Gmap corresponding to each of the gear shift stages may be used, and if a Gmap is used, the ratio map is not required.

If a torque transmitted to the road surface is calculated in consideration of the torque amplifying effect due to the slipping of the torque converter 2 of the automatic transmission for calculating the presumed vehicle speed VYS, and the presumed vehicle speed VYS is corrected based on the transmitted torque, a higher accuracy control can be performed.

The present embodiment is not applied to the case where a control for alleviating a shift shock (an in-gears coast control) is carried out by establishing the first gear shift stage after establishment of the third gear shift stage for a moment, when the shift lever is shifted from the N position to the D position in a state in which the engine rotation-speed is higher than an idling rotation-speed Ne. Namely, the upshifting to the third gear shift stage by the in-gears coast control is carried out as usual.

The time of 320 msec required for the on-ice determination at Step S1 has been used as the reference time for determining whether slipping has been generated during the upshifting from the first gear shift stage to the second gear shift state at Step S3B in the embodiment. However, the reference time is not necessarily set equal to the time required for the on-ice determination.

As discussed above, when the vehicle traveling at the high speed on a usual road surface is braked hard to lock the drive wheels, the speed of rotation of the drive wheels restoring the gripping is increased steeply from zero, if the braking is canceled. This phenomenon can be misjudged as being the slipping of the drive wheels at the starting of the vehicle on the ice, thereby prohibiting of the shifting of the automatic transmission, resulting in the possibility that over-revolution of the engine is produced. However, if the coupler slip rate detecting means detects that the drive wheels have been shifted from the locked state to the unlocked state, on the basis of the fact that the slip rate of the coupler is equal to or larger than the predetermined value, the shifting-prohibition canceling means cancels the prohibition of the shifting by the shifting prohibiting means. Therefore, the precise upshifting can be performed to prevent the over-revolution of the engine.

Although the embodiment of the present invention has been described in detail, it will be understood that the present invention is not limited to the above-described embodiment, and various modifications may be made without departing from the subject matter of the invention.

We claim:

1. A control system for an automatic transmission for a vehicle said automatic transmission having a rotatable member, said system comprising a shifting control means for changing the gear shift stage of the automatic transmission in accordance with the operational state of the vehicle, a vehicle speed detecting means for detecting the vehicle speed based on the rotational speed of said rotatable member of said automatic transmission, a slipping-state determining means for determining a slipping state of the vehicle based on the variation in vehicle speed detected by said vehicle speed detecting means, a shifting prohibiting means for prohibiting the shifting of said automatic transmission by said shifting control means, when a slipping state is determined by said slipping-state determining means, a coupler for connecting the vehicle engine and the automatic transmission to each other, a coupler slip rate detecting means for detecting a slip rate of said coupler, and a shifting-prohibition canceling means for canceling the prohibition of the shifting by said shifting prohibiting means, when the slip rate of said coupler is determined to be equal to or larger than a predetermined value by said coupler slip rate detecting means.

2. A control system for an automatic transmission for a vehicle according to claim 1, wherein said coupler is a torque converter.

* * * * *